United States Patent
Kyösti et al.

(10) Patent No.: US 7,028,232 B2
(45) Date of Patent: Apr. 11, 2006

(54) ERROR ESTIMATION METHOD AND APPARATUS

(75) Inventors: Pekka Kyösti, Oulu (FI); Mikko Säily, Oulu (FI)

(73) Assignee: Nokia Corporation, Espoo (FI)

( * ) Notice: Subject to any disclaimer, the term of this patent is extended or adjusted under 35 U.S.C. 154(b) by 412 days.

(21) Appl. No.: 10/067,088

(22) Filed: Feb. 4, 2002

(65) Prior Publication Data
US 2002/0157046 A1    Oct. 24, 2002

Related U.S. Application Data (63) Continuation of application No. PCT/EP00/05687, filed on Jun. 20, 2000.

(51) Int. Cl.
*G06F 11/00* (2006.01)

(52) U.S. Cl. .................................... 714/704

(58) Field of Classification Search ............... 714/704, 714/709
See application file for complete search history.

(56) References Cited

U.S. PATENT DOCUMENTS

| | | | | |
|---|---|---|---|---|
| 3,665,394 A | | 5/1972 | Lender et al. | |
| 4,761,796 A | * | 8/1988 | Dunn et al. | 375/133 |
| 5,119,400 A | | 6/1992 | Koch | |
| 5,233,628 A | * | 8/1993 | Rappaport et al. | 375/224 |
| 5,283,531 A | | 2/1994 | Serizawa et al. | |
| 5,303,263 A | | 4/1994 | Shoji et al. | |
| 5,648,991 A | * | 7/1997 | Namekata et al. | 375/341 |
| 6,160,443 A | * | 12/2000 | Maalej et al. | 329/304 |
| 6,314,147 B1 | * | 11/2001 | Liang et al. | 375/346 |
| 6,504,868 B1 | | 1/2003 | Koizumi | |
| 6,625,236 B1 | | 9/2003 | Dent et al. | |

FOREIGN PATENT DOCUMENTS

EP    0739117    10/1996

* cited by examiner

*Primary Examiner*—Joseph Torres (57) ABSTRACT

Bit error rate or bit error probability of a received signal of a wireless telecommunication system is estimated, wherein a channel impulse response is estimated from the received signal, and the received signal is subjected to a channel equalizing operation performed on the basis of time statistics derived from the channel impulse response. Additionally, adaptive reference time domain characteristics are calculated from a weighting information obtained from the channel impulse response estimation that may be used to perform a reference channel equalizing operation for obtaining an additional output signal to be compared with the output signal of the channel equalizing operation so as to determine an estimation of the bit error rate based on the detected difference.

13 Claims, 5 Drawing Sheets

ERROR ESTIMATION METHOD AND APPARATUS

CROSS-REFERENCE TO RELATED APPLICATION

This application is a continuation of International Application PCT/EP00/05687 having an international filing date of Jun. 20, 2000 and from which priority is claimed under all applicable sections of Title 35 of the United States Code including, but not limited to, Sections 120, 363 and 365(c).

FIELD OF THE INVENTION

The present invention relates to a method an apparatus for estimating a bit error rate or probability, respectively, of a received signal of a wireless telecommunication system such as a GSM (Global System for Mobile communications) system.

BACKGROUND OF THE INVENTION

The performance of a digital communication process in a mobile or wireless radio transmission system is constrained by non-ideal characteristics of the transmission channel whose main impairments are additive noise and intersymbol interference caused by multipath propagation in the available bandwidth. Thus, fading environments and presence of interference lead to high transmission error probabilities. Most radio systems have error rates of around $10^{-2}$ (i.e. one out of hundred bits is erroneous). The simplest way to reduce this error rate would be to increase the transmitted power such that even in a deep fade there would still be sufficient signal strength to reliably receive the signal. However, this would just increase the interference to the next cell, resulting in an increased error rate in that cell. An alternative, and better, approach is to add redundancy to the transmitted signal. This has the effect of increasing the bandwidth required for transmission but allowing the receiver to use knowledge of the redundancy to remove errors. This tradeoff of bandwidth for decreased error rates is the basis of error correction systems.

There are two different types of error control systems, those based on block coding and those based on convolutional coding. Both work by adding extra information to the data to be transmitted and then using a knowledge of the redundancy in order to correct errors in the original data. The difference between block and convolutional coding is the manner in which the redundancy is added. Block codes add a block of extra data after the information to be transmitted. Convolutional codes modify the data itself, adding redundancy in the process.

BER (Bit Error Rate) evaluation is usually done in GSM systems using a convolutional decoder output information, wherein decoded bits are encoded again using the same polynomials. The obtained two bit vectors are compared bit by bit. The difference between these e.g. 456 bit long vectors implies the actual BER. This method is called pseudo BER.

The BER may be evaluated in the receiver of wireless telecommunication systems in order to obtain a good estimate of BER required for example in radio link adaptation and speech and data service quality estimation. However, the above pseudo BER leads to the problem that the required convolutional coding and decoding are time-consuming operations which require a large amount of program and data memory.

SUMMARY OF THE INVENTION

It is therefore an object of the present invention to provide an error estimation method an apparatus, by means of which processing power can be reduced.

This object is achieved by a method for estimating a bit error rate of a received signal of a wireless telecommunication system, the method comprising the steps of:
   estimating a channel impulse response based on the received signal;
   subjecting the received signal to a channel equalizing operation performed on the basis of time statistics derived from the channel impulse response;
   determining adaptive reference time domain characteristics based on actual weighting information obtained from the channel estimating step;
   subjecting the received signal to a reference channel equalizing operation performed on the basis of the adaptive reference time domain characteristics; and
   estimating the bit error rate by comparing the output signals of the channel equalizing operation and the reference channel equalizing operation.

Additionally, the above object is achieved by an apparatus for estimating a bit error rate in a received signal of a wireless telecommunication system, the apparatus comprising:
   estimating means for estimating a channel impulse response based on the received signal;
   channel equalizing means for subjecting the received signal to a channel equalizing operation performed on the basis of time statistics derived from the channel impulse response;
   determining means for determining adaptive reference time domain characteristics based on an actual weighting information supplied form the estimating means;
   reference channel equalizing means for subjecting the received signal to a reference channel equalizing operation performed on the basis of the adaptive reference time domain characteristics; and
   comparing means for comparing the output signals of the channel equalizing means and the reference channel equalizing means to obtain the estimation of the error rate.

Accordingly a simple option for estimating BER is provided, which may readily be implemented, since any equalizers provided in the respective receiving units already provide most of the functions needed in the proposed structure.

Furthermore, due to the adaptive nature of the reference channel equalizing operation, the actual BER follows different static and fading conditions, such that it can adapt to static, frequency selective and time selective radio channels.

The proposed BER estimation is well suitable for e.g. determining radio channel quality since it may normalize different channel types by the determined adaptive reference time domain characteristics. Moreover, it may as well be used in fast link adaptation (i.e. choosing channel coding schemes) and radio link management (e.g. handover decisions).

Since the BER estimation is based on a comparison between two channel equalizing output signals, almost three times fewer samples are required to be processed as compared to the initially mentioned pseudo BER algorithm.

Thus, in summary, a simple BER estimation scheme which requires less processing resources and which may easily be implemented is achieved.

Furthermore, the above object is achieved by a method for estimating a bit error probability of a received signal of a wireless telecommunication system, the method comprising the steps of:

estimating a channel impulse response based on the received signal;

subjecting the received signal to a channel equalizing operation performed on the basis of time statistics derived from the channel impulse response; and calculating the bit error probability by using an actual weighting information obtained from the channel estimating step and the output signal of the channel equalizing operation.

Additionally, the above object is achieved by an apparatus for estimating a bit error probability of a received signal of a wireless telecommunication system, the apparatus comprising:

estimating means for estimating a channel impulse response based on the received signal;

channel equalizing means for subjecting the received signal to a channel equalizing operation performed on the basis of time statistics derived from the channel impulse response; and calculating means for calculating the bit error probability by using an actual weighting information supplied from the estimating means and the output signal of the channel equalizing means.

Accordingly, the proposed bit error probability estimation scheme leads to good estimates in different static and fading conditions and can adapt to static, frequency-selective and time-selective radio channels. Due to the combined use of the channel equalizing output signal and the actual weighting information, this estimation scheme requires considerably less calculations than the pseudo BER algorithm. Especially, if bitwise error probabilities are precalculated into a look-up table or the like, the calculation requirements may considerably be reduced.

Thus, both alternative solutions to the above problem are based on an adaptation of the error rate or error probability estimation to the time-varying channel based on the actual weighting information. Thereby, an adaptation to static, frequency-selective and time-selective radio channels can be achieved at reduced processing requirements. This is possible for any kind of signals (e.g. block-coded signals, convolutional-coded signals, or even non-coded signals), whereas the above mentioned pseudo BER cannot be used in cases where recursive convolutional codes are used.

Preferably, the received signal is a matched filtered signal, wherein the actual weighting information may comprise an information obtained from the corresponding matched filter operation.

The time statistics may be estimated by using correlations between received and known training sequences. In particular, the correlations may present delay spread and multi path propagation effects caused by a radio channel through which the received signal has been transmitted. The correlations may be used in the channel equalizing operation as a decision metric addition to matched filtered samples.

Preferably, the bit error probability may be calculated burstwise on the basis of the following equation:

$$BEP = \frac{1}{N} \sum_{k=1}^{N} \frac{1}{1 + e^{|a \cdot L_k|}}$$

wherein N denotes the numbers of bits in the burst, $L_k$ denotes the k-th soft bit, and a denotes a channel-specific parameter.

The channel-specific parameter may be a constant, or may be calculated on the basis of the following equation:

$$a = b + \frac{E}{E + var}$$

wherein a denotes the channel-specific parameter, b denotes a predetermine scaling constant, E denotes the energy of the burst, and var denotes the variance of the burst.

Furthermore, the determination of the channel-specific parameter may be performed in dependence on the amount of phase error determined in the channel equalizing operation. Thereby, high velocity channels can be identified from a phase error caused by a doppler shift.

Furthermore, the determination of the channel-specific parameter may be performed in dependence on the amount of energy included in a predetermined number of taps of the estimated channel impulse response. Thereby, channels with long impulse responses can be discriminated, and the channel-specific parameter can be adapted correspondingly.

Furthermore, the bit error probability calculation may be performed in dependence on the relation between the standard deviation or variance and the mean of the means of a predetermined number of soft bits obtained from the channel equalizing operation. In this case, the predetermined number of soft bits with the smallest mean is used for calculating the bit error probability, if the relation exceeds a predetermined threshold. Thereby, the burst is divided into smaller blocks which are considered separately. This effects on the edge of the fading dip, if one end of the burst is fading and another one is in good conditions.

BRIEF DESCRIPTION OF THE DRAWINGS

In the following, the present invention will be described in greater detail on the basis of preferred embodiments with reference to the accompanying drawings, in which.

DESCRIPTION OF THE PREFERRED EMBODIMENT

In the following, the preferred embodiments of the method and apparatus according to the present invention will be described on the basis of a receiver of a GSM system.

Figure 1:
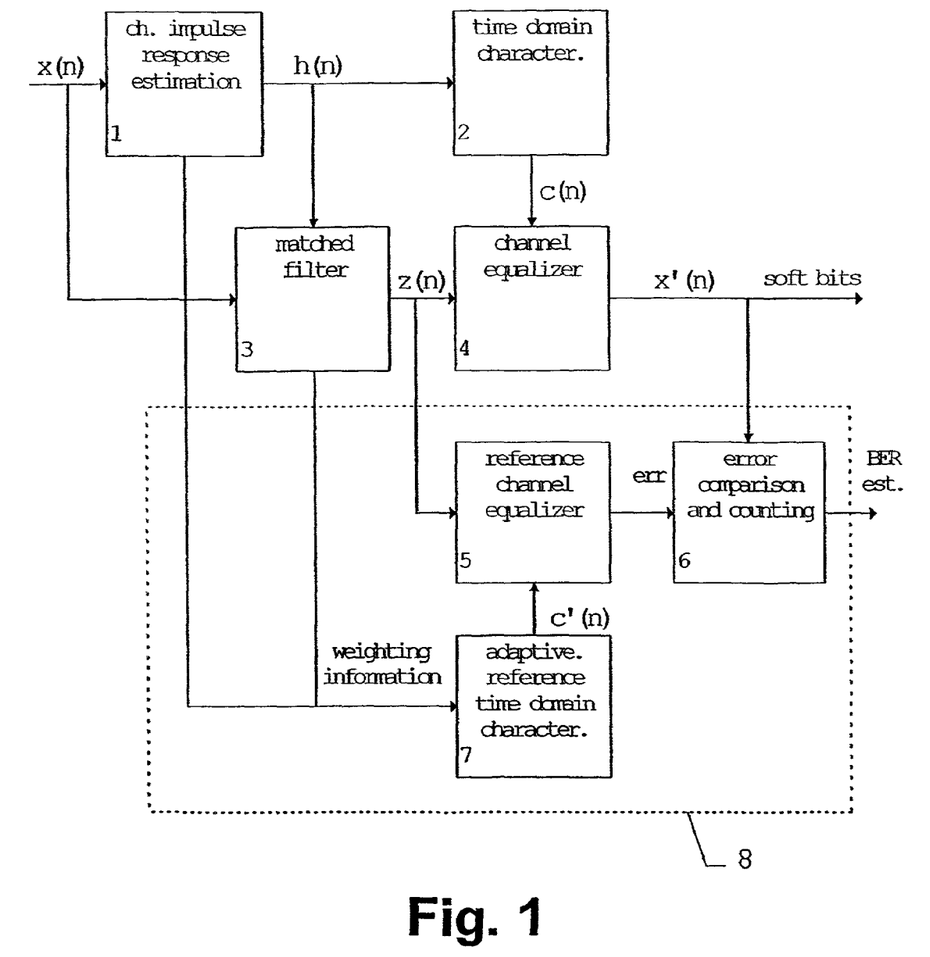
FIG. 1 shows a basic block diagram of a bit error rate estimator according to a first preferred embodiment of the present invention.

FIG. 1 shows a bit error rate estimator according to the first preferred embodiment, wherein samples x(n) obtained from a received GSM signal are supplied to a channel impulse response estimation unit 1 in which the time statistics of the radio channel through which the received signal has been transmitted are estimated using correlations between a training sequence included in the received signals and a known training sequence. These correlations represent delay spread and multi path propagation effects caused by the radio channel.

The output signal h(n) of the channel impulse response estimation unit 1 is supplied to a unit 2 for deriving channel time domain characteristics c(n) used for controlling a channel equalizing operation performed in a channel equalizer 4. In particular, the time domain characteristics c(n) may comprise an information concerning time dispersion (e.g. multipath and intersymbol interference) of the channel, which may be derived by calculating autocorrelations of the estimated impulse response. The channel equalizer 4 is arranged to remove waveform distortions at the receiver, caused when the signal bandwidth becomes comparable to the coherence bandwidth of the fading mobile radio channel (frequency selective fading). The time domain characteristics reflect the multipath propagation of the concerned radio channel and are used in the channel equalizer as a decision metric addition to matched filtered samples z(n) received from a matched filter 3 through which the received samples x(n) are supplied and which is controlled on the basis of the output signal h(n) of the channel impulse response estimation unit 1.

In particular the matched filter 3 is a linear circuit (i.e. a transversal filter) whose tap coefficients are matched to the radio channel on the basis of the output signal h(n) of the channel impulse response estimation unit 1. However, the matched filter 3 is not an essential requirement. It may be replaced e.g. by using a frequency error estimation function (including a channel type identification). Then, an adaptation to errors caused by frequency dispersion is possible to a certain degree.

When the time domain characteristic (e.g. delay spread) of the radio channel is an adequate estimation, the resulting corrective decision information obtained by the channel equalizer 4 can be used to correct errors to thereby remove intersymbol interference from the matched filtered samples z(n). The soft bits of the corrected samples x'(n) are output from a channel equalizer 4 and supplied as a reference signal ref to an error comparison and counting unit 6.

The use of channel equalizers for removal of waveform distortions at the receiving side is commonly known. In such equalizers (e.g. a Viterbi equalizer), a decision is made based on the channel impulse response as to how the received signals are to be interpreted, i.e. how the symbols are to be detected from the mixture of received signal components caused by interference and multipath propagation. Thus, the main purpose of the channel equalizer 4 is to reconstruct the received signal or to generate a replica signal in such a manner that it is as similar as possible to the originally transmitted signal. This is achieved by using the time statistics derived from the channel impulse response which has been estimated e.g. on the basis of the known training pattern (i.e. training sequence).

According to FIG. 1, the matched filtered samples z(n) obtained from the matched filter 3 are supplied to an additional reference channel equalizer 5 to which adaptive reference time domain characteristics (modified reference time statistics) are supplied from a unit 7 for obtaining or determining adaptive reference time domain characteristics on the basis of an actual weighting information obtained from the channel impulse response estimation unit 1 and the matched filter 3. The weighting information is used by the adaptive reference time domain characteristics determining unit 7 to generate modified or adaptive reference time statistics as channel delay spread and signal distortion metrics required in the reference equalizer 5 to perform an adaptive time-varying channel equalizing operation. The weighting information includes a burst energy and burst variance information. Furthermore, an information about the channel type may be included which can be obtained from an indication done according to the estimated channel impulse response and the matched filter output. Thus, the adaptive channel equalizing operation performed by the reference channel equalizer 5 is suitable for equalizing time-varying radio channels.

Compared to the information obtained from unit 2, the output information of the adaptive reference time domain characteristics determining unit 7 is derived in a similar way but modified so that the reference channel equalizer 5 does not remove the effects caused by signal time dispersion. The time domain characteristics (i.e. autocorrelations) are tuned according to the weighting information obtained from the matched filter 3 and the channel impulse response estimation unit 1. The adaptive reference time domain characteristics can be calculated by multiplying time domain characteristics c(n) (obtained as in the unit 2) with a coefficient c.

In case a channel type information is included in the weighting information, the coefficient c can be calculated by using the following equation:

$$c = b + k \cdot \frac{E}{E + a \cdot var} \qquad (1)$$

wherein E denotes the burst energy, var denotes the burst variance, and b, k and a denote constants depending on the channel type.

Due to the adaptive nature of the reference channel equalizer 5, transmission errors are propagated to its output. Thus, the output signal of the reference channel equalizer 5 can be used as an erroneous comparison signal err based on which errors corrected in the other channel equalizer 4 can be determined.

The error comparison and counting unit 6 is arranged to compare the output signal x'(n) of the channel equalizer 4 and the erroneous signal err supplied from the active channel equalizer 5, wherein the difference (e.g. number of different bit values) is calculated or counted for example over a predetermine BER measuring period. The obtained value is output as the BER estimation value.

Accordingly, the reference channel equalizer 5, the adaptive reference time domain characteristics determining unit 7 and the error comparison and counting unit 6 constitute a BER estimator 8 in which the equalized output signal x'(n) is compared with the output signal of the reference channel equalizer 5 so as to derive the BER estimation.

Figure 2:
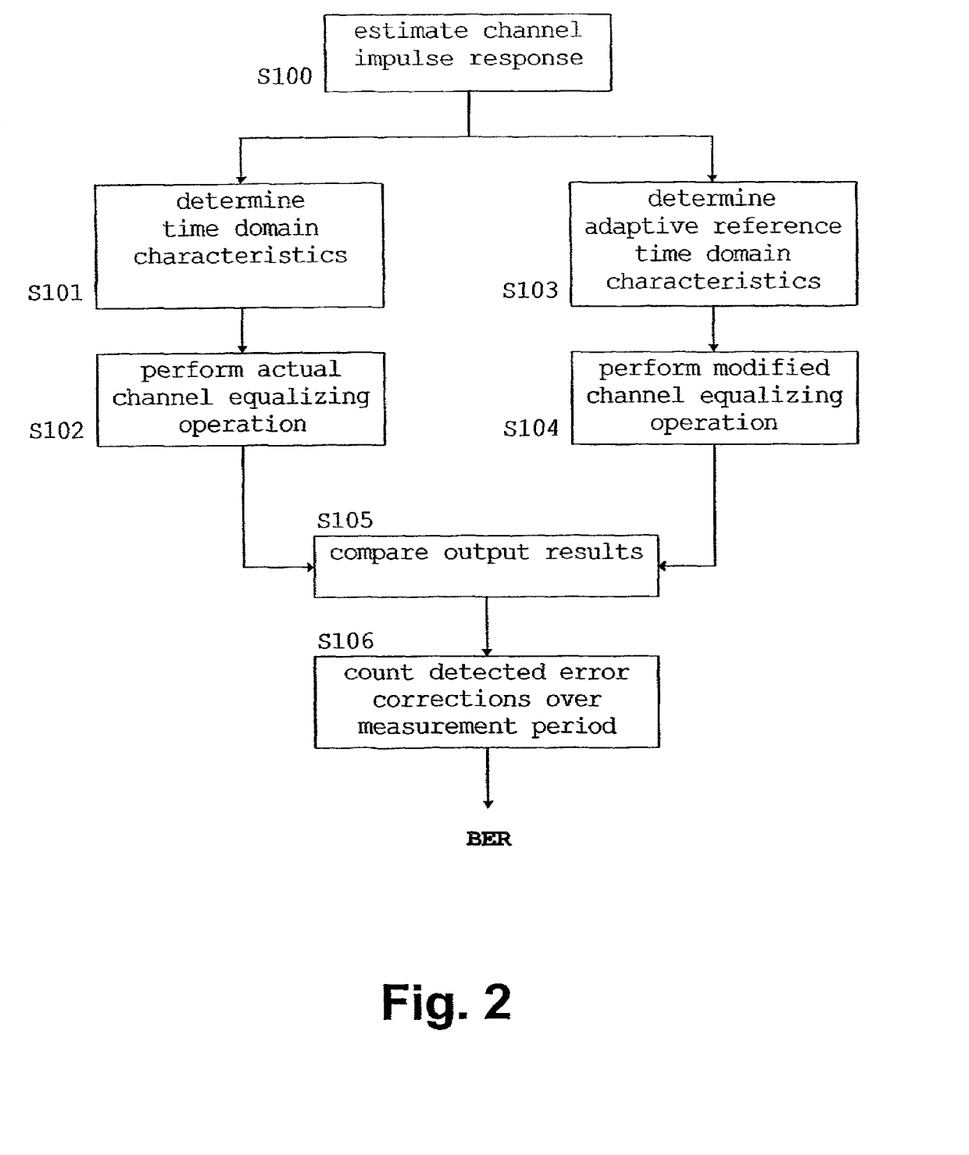
FIG. 2 shows a flow diagram of the bit error rate estimation according to the first preferred embodiment.

FIG. 2 shows a basic flow diagram of the bit error rate estimation method according to the first preferred embodiment shown in FIG. 1. According to FIG. 2, the channel impulse response is estimated in step S100. Then, based on the result of the channel impulse response estimation (i.e. estimated impulse response), the channel time domain characteristics are determined in step S101 using correlations between the received and known training sequences. These time domain characteristics are then used in the channel equalizer 4 as a decision metric addition to the matched filtered samples, so as to perform an actual channel equalizing operation in step S102 in order to obtain a corrected receiving signal in which any intersymbol interferences are removed.

Parallel to the above steps S101 and S102, adapted reference time domain characteristics are determined in step S103 (e.g. based on the above equation (1) or only on the burst energy and variance information), reflecting the time-varying channel and being derived from the weighting information obtained from the channel impulse response estimation unit 1 and the matched filter 3. These modified reference time domain characteristics are used in the reference channel equalizer 5 to perform a modified channel equalizing operation in step S104 to the same matched filtered samples as used in step S102. The output results of the two parallel channel equalizing operations are compared in step S105 so as to detect different bit values indicating errors corrected in step S102. The detected errors are counted in step S106 over a predetermined measurement period. Hence, the count result corresponds to the estimated BER.

In the above BER estimation according to the first preferred embodiment, the number of samples to be processed is almost three times fewer as compared to the pseudo BER algorithm, since an additional encoding after the coding step is not required.

In the following, a receiving quality estimation based on a bit error probability (BEP) estimation is described as a second preferred embodiment with reference to FIGS. 3 to 5.

In the second preferred embodiment, the weighting information comprising the burst energy and variance information is directly used to calculate the BEP.

Figure 3:
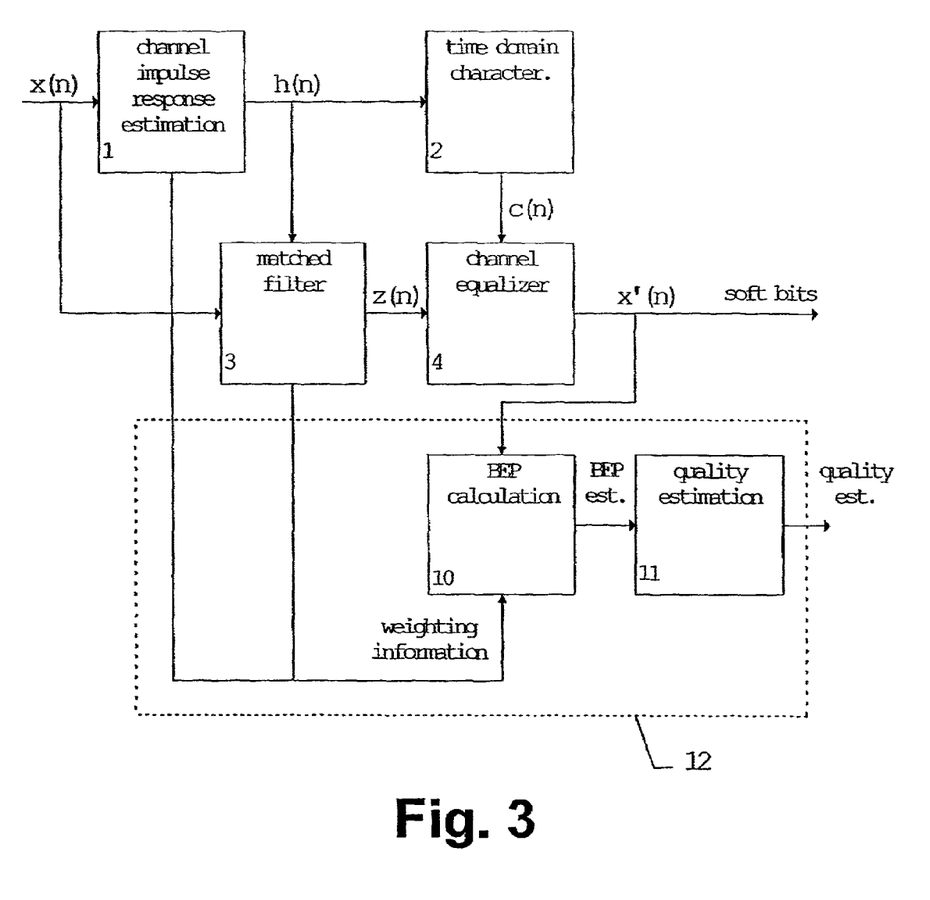
FIG. 3 shows a basic block diagram of a receiving quality estimator comprising an error probability estimator according to a second preferred embodiment of the present invention.

FIG. 3 shows a basic block diagram of a receiving quality estimator comprising a BEP estimator. The function and arrangement of the units or blocks 1 to 4 correspond to those described in the first preferred embodiment, such that the corresponding explanations are not repeated here.

Contrary to the first preferred embodiment, a receiving quality estimator 12 is provided which comprises a BEP calculation unit 10 to which the weighting information is supplied from the channel impulse response estimation unit 1 and the matched filter 3, and which may generate a channel-specific parameter, e.g. scaling coefficient a, characterizing the actual channel characteristic. The scaling coefficient a is used in the BEP calculation unit 10 to which the equalized output signal x'(n) of the channel equalizer 4 is supplied as a second input signal.

The BEP may then be calculated in the BEP calculation unit 10 on the basis of the following equation:

$$BEP = \frac{1}{N} \sum_{k=1}^{N} \frac{1}{1 + e^{|a \cdot L_k|}} \quad (2)$$

wherein N denotes the number of bits in a burst of the received signal, $L_k$ denotes the k-th soft bit at the output of the channel equalizer 4, and a denotes the scaling coefficient. The calculated BEP estimation is then supplied to a quality estimation unit 11 which estimates the receiving quality in a known manner over a predetermined measurement period, as specified e.g. in the specification GSM 05.08. The estimated quality may be used for example as a criterion in the RF power control and for handover processes.

The BEP estimate is calculated burstwise, i.e. over a TDMA (Time Division Multiple Access) burst, and averaged over a quality estimation management period (e.g. 104 bursts). The range of BEP may be divided into 8 non-linear sections which correspond to certain receiving quality levels.

The scaling coefficient a determined in the BEP calculation unit 10 may be either a constant or a function of certain parameters.

A constant scaling coefficient a (e.g. 2.9) can fulfill the specifications for certain channel models, e.g. TU50 and static channel. However, other channel models, e.g. RA250 and HT100, require the coefficient a to be somehow adaptive. The HT channel and the high velocity RA channel can be identified by the BEP calculation unit with a certain accuracy based on the received weighting information, and a suitable scaling coefficient a can then be determined for each channel type after the identification thereof. The scaling coefficient a may be determined on the basis of the energy and variance of the burst, which are calculated in the channel equalizer 4 and supplied to the BEP calculation unit 10. Then, the scaling parameter a may be calculated on the basis of the following equation:

$$a = b + \frac{E}{E + var}, \quad (3)$$

wherein b denotes a constant that can be scaled in order to adapt the scaling coefficient a so as to reflect the individual channel characteristic, E denotes the energy of the burst, and var the variance of the burst.

This adaptivity of the scaling coefficient a is valuable for the above channel models RA250 and HT100, and has a minor effect on the performance with the channel models TU50 and static.

Figure 4:
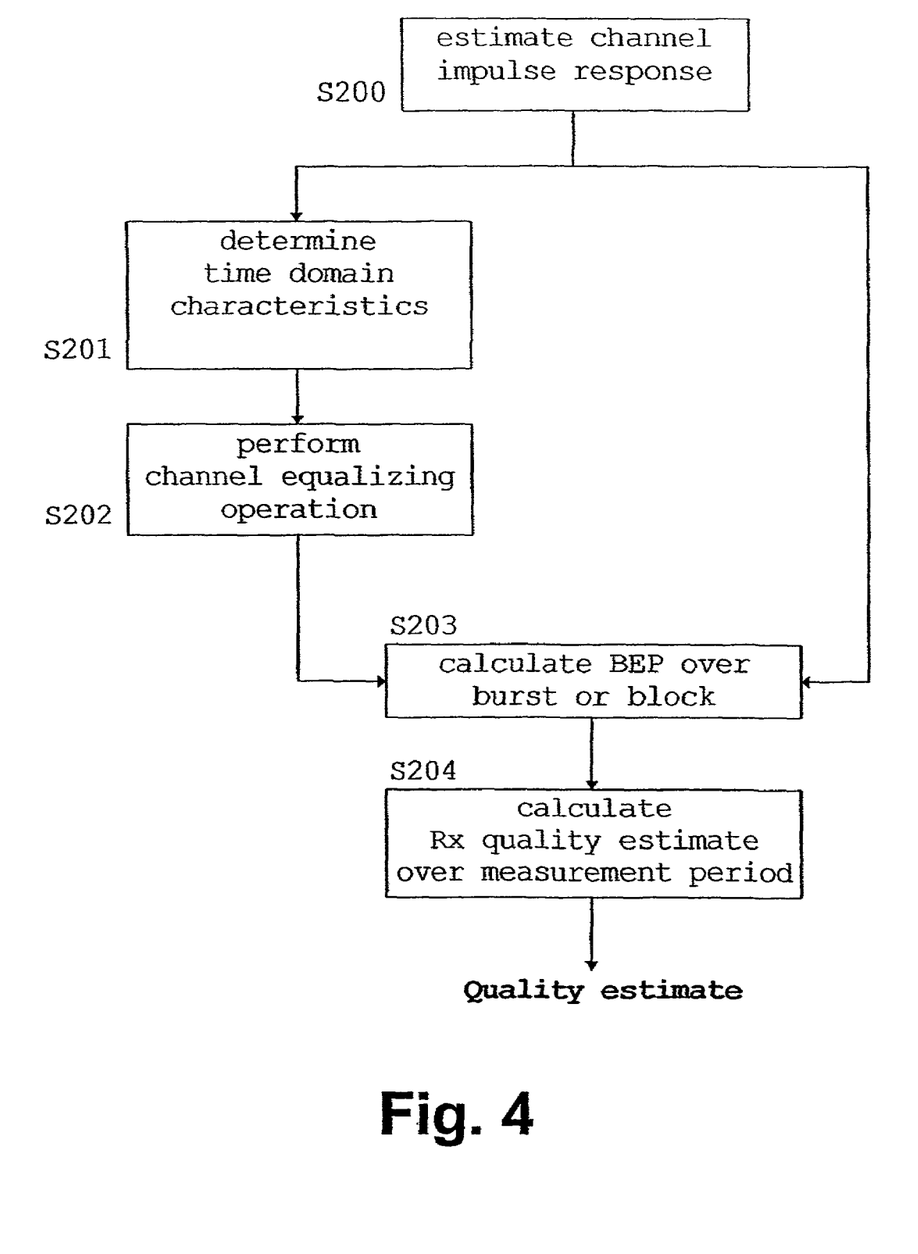
FIG. 4 shows a basic flow diagram of the error probability estimation according to the second preferred embodiment.

FIG. 4 shows a basic flow diagram of the quality estimation according to the second preferred embodiment. In step S200, the channel impulse response is estimated in order to be used in step S201 to determine the channel time domain characteristics or time statistics which are supplied to the channel equalizer 4 in order to perform a decision metric addition to the received matched filtered samples (step S202). In parallel the weighting information obtained from the channel impulse response estimation and from the matched filter is used in step S203 to identify the channel models and to determine the general coefficient a, so as to calculate the BEP. In particular, the output signal of the channel equalizer 4, i.e. the soft bit values $L_k$, and the channel coefficient a are used in step S203 to calculate the BEP based on the above equation (2). Then the calculated BEP is used in step S204 to calculate the receiving quality estimate.

Thus, the estimation of the BEP is obtained by performing a channel equalizing operation based on the estimated channel impulse response and a parallel determination of adaptive reference time domain characteristics based on the weighting information from the channel impulse response estimation unit 1 and the matched filter 3 and used to determine a channel-specific scaling parameter a. The estimation of the BEP is then calculated by using the output signal x'(n) of the channel equalizer 4 and the scaling coefficient a adapted to the actual channel characteristic.

Figure 5:
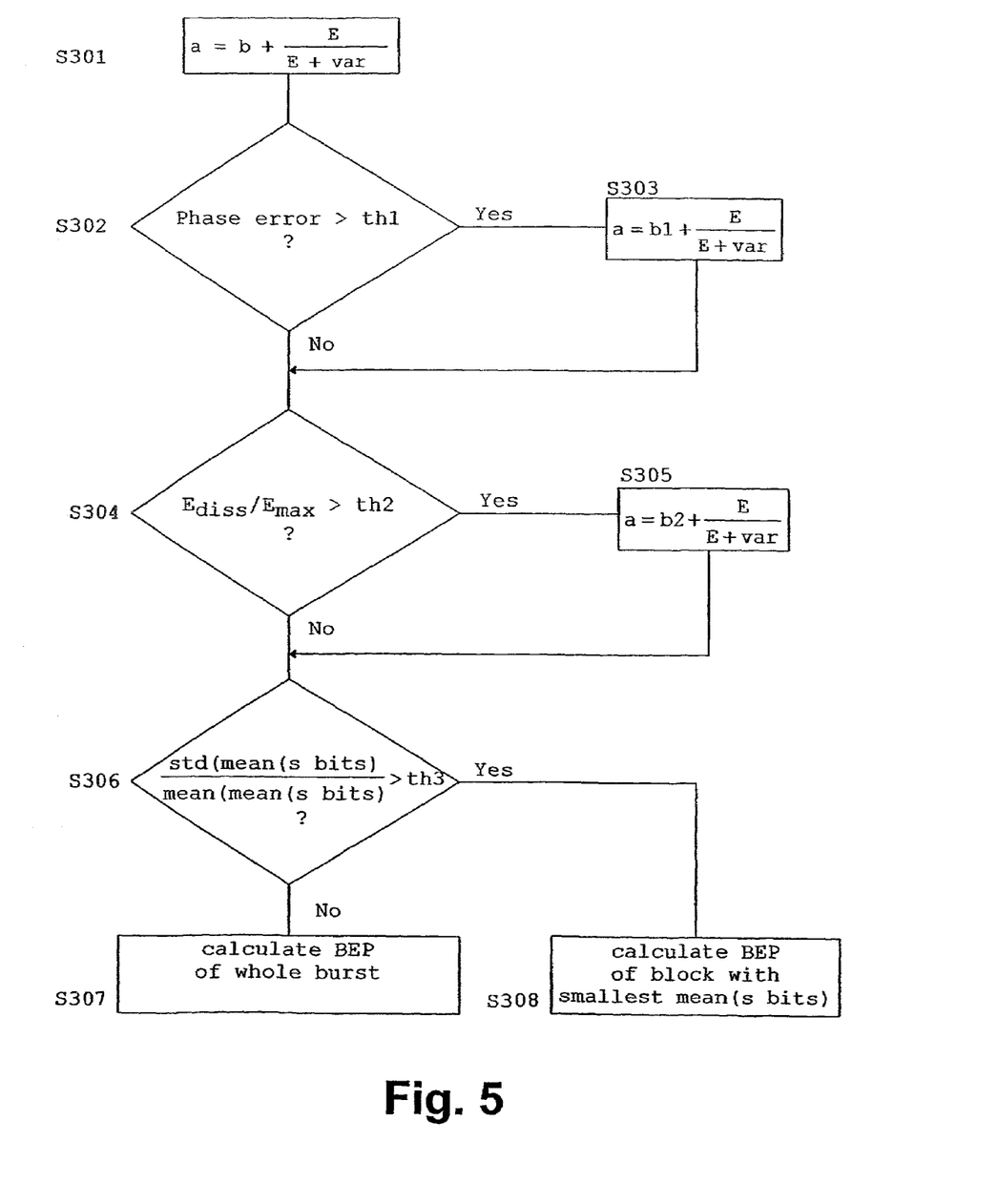
FIG. 5 shows a flow diagram of the error probability calculation according to the second preferred embodiment.

FIG. 5 shows a flow diagram of the BEP estimation performed in the BEP calculation unit 10. In step S301 the scaling coefficient a is calculated on the basis of the above-mentioned equation (3), wherein a default value is used for the constant b. Then, a phase error calculated in the general equalizer 4 based on an information obtained from the matched filter 3 is compared with a predetermined threshold th1. The phase error is usually caused by a doppler shift and can hence be used as an indicator for indicating the high velocity RA channel model (step S302). If the determined phase error exceeds the first predetermined threshold value th1, the scaling coefficient a is determined in step S303 as a value (e.g. 1.4) specific to the RA250 channel model.

If the phase error is less than or equal to the first threshold value th1, the flow proceeds to step S304 where the energy distribution in the taps of the estimated impulse response is used to discriminate the HT channel type.

In particular, the HT channel impulse response is relatively long, such that there is at least a predetermined energy remaining in the two dismissed taps. Therefore, the channel equalizer 4 calculates seven tap estimates of the impulse response. Then, a window of five taps with maximum energy is searched. The ratio between the maximum energy of the five taps and the energy in the remaining two dismissed taps is calculated on the basis of the following equation:

$$s = \frac{E_{dismissed}}{E_{\max\ energy}} \quad (4)$$

wherein $E_{max}$ energy denotes the energy of the five window taps with the maximum energy, and $E_{dismissed}$ denotes the energy of the two dismissed taps. In particular, the energy values may be obtained by calculating the sum of geometric additions of the real parts and the imaginary parts of the tap coefficients.

In step S304, the above ratio s is compared with a second threshold value th2 (e.g. 0.11). If the ratio s exceeds the second threshold value th2, a scaling coefficient a (e.g. 4.2) specific to the HT channel model is calculated in step S305.

If the ratio s is smaller than or equal to the second threshold value th2, the flow proceeds to step S306 where a variance coefficient is calculated. High velocity RA channel models with good signal to noise ratio tend to have too low BEP values as compared to the actual BER. This may be compensated by dividing the burst into smaller blocks and considering the blocks separately. This effects on the edge of the fading dip, when one end of the burst is fading and the other is still in good conditions. The variance coefficient may be calculated on the basis of the following equation:

$$v = \frac{std(means)}{mean(means)} \quad (5)$$

wherein std(means) denotes the standard deviation of the mean values of the soft bits of every block (e.g. s bits) of a burst (e.g. 8 blocks) and wherein means(means) denotes the mean value of the means of the soft bits of every block. It is to be noted that, in the above equation, the standard deviation std can be replaced by the variance var.

The variance coefficient is determined in the BEP calculation unit 10 and is compared in step S306 with a third threshold value th3 (e.g. 0.2). If the calculated variance coefficient is larger than the third threshold value th3, the BEP of the whole burst is calculated based on the equation (2) using only the soft bits of a selected block having the smallest mean of soft bits (step S308).

If the variance coefficient is less than or equal to the third threshold value th3, the BEP is calculated using the whole burst, i.e. the BEP is the mean of the BEP of every block (step S307).

Thus, an adaptive estimation of the BEP based on a scaling coefficient a adapted to an individual channel model is achieved. This estimation requires considerably less calculations than the pseudo BER algorithm based on which the quality estimation can be performed. Especially, in case some of the scaling coefficients are dropped out and bitwise BEPs are precalculated into a look-up table, the required calculations can be reduced considerably. The workload may be further decreased by reducing the number of bits of the burst taken into account.

It has to be stressed that the channel adaptation not necessarily has to be implemented by determining the channel parameter a or by using the channel type information. In practice, the real radio channel is usually a mixture of different channel types. This makes the channel type detection difficult. Therefore, the described error estimation may solely be based on the use of the adaptive reference time domain characteristics, wherein the weighting information only comprises the burst energy and burst variance information.

In summary, the present invention relates to a method and apparatus for estimating a bit error rate or bit error probability of a received signal of a wireless telecommunication system, wherein a channel impulse response is estimated from the received signal, and the received signal is subjected to a channel equalizing operation performed on the basis of time statistics derived from the channel impulse response. Additionally, adaptive reference time domain characteristics are calculated from a weighting information obtained from the channel impulse response estimation. The adaptive reference time domain characteristics may be used to perform a reference channel equalizing operation for obtaining an additional output signal to be compared with the output signal of the channel equalizing operation so as to determine an estimation of the bit error rate based on the detected difference. Alternatively, the actual weighting information and the output signal of the channel equalizing operation may be used to calculate a bit error probability. Thus, the bit error rate or bit error probability can be estimated with a simple procedure requiring less processing resources.

It is to be pointed out that the bit error rate or bit error probability estimation method and apparatus described in the above first and second preferred embodiments, respectively, can be applied to any wireless telecommunication system. Moreover, any channel impulse response estimation suitable for deriving time statistics for a channel equalizer may be used in the present invention. The channel equalizer 4 may be any equalizer suitable for removing intersymbol interference from matched filtered samples. Furthermore, the reference channel equalizer 5 may be any adaptive equalizer suitable for equalizing time-varying channels.

Thus, the above description of the preferred embodiments and the accompanying drawings are only intended to illustrate the present invention. The preferred embodiments may vary within the scope of the attached claims.

The invention claimed is:

1. A method for estimating a bit error rate of a received signal of a wireless telecommunication system, said method comprising the steps of:
   a) estimating a channel impulse response from said received signal;
   b) subjecting said received signal to a channel equalizing operation performed by using time domain characteristics derived from said channel impulse response;
   c) determining adaptive reference time domain characteristics from an actual weighting information obtained from said channel estimating step;
   d) subjecting said received signal to a reference channel equalizing operation performed by using said adaptive reference time domain characteristics; and
   e) estimating said bit error rate by comparing output signals of said channel equalizing operation and said reference channel equalizing operation with each other.

2. A method according to claim 1, wherein said received signal is a matched filtered signal, and wherein said actual weighting information comprises an information obtained from a corresponding matched filter operation.

3. A method according to claim 1, wherein said channel impulse response is estimated by using correlations between received and known training sequences.

4. A method according to claim 3, wherein said correlations represent delay spread and multi path propagation effects caused by a radio channel through which said received signal has been transmitted.

5. A method according to claim 3, wherein said correlations are a decision metric addition to matched filtered samples.

6. A method according to claim 1, wherein said adaptive reference time domain characteristics are a channel delay spread and signal distortion metric in said reference channel equalizing operation.

7. A method according to claim 1, wherein said estimating of said bit error rate is performed by calculating a difference between said output signals of said channel equalizing operation and said reference channel equalizing operation over a predetermined measuring period.

8. An apparatus for estimating a bit error rate in a received signal of a wireless telecommunication system, said apparatus comprising:
   a) estimating means for estimating a channel impulse response from said received signal;
   b) channel equalizing means for subjecting said received signal to a channel equalizing operation performed by using time domain characteristics derived from said channel impulse response;
   c) determining means for determining adaptive reference time domain characteristics from an actual weighting information supplied from said estimating means;
   d) reference channel equalizing means for subjecting said received signal to a reference channel equalizing operation performed by using said adaptive reference time domain characteristics; and
   e) comparing means for comparing output signals of said channel equalizing means and said reference channel equalizing means with each other to obtain said estimation of said bit error rate.

9. An apparatus according to claim 8, further comprising a matched filter through which said received signal is supplied to said channel equalizing means and said reference channel equalizing means, wherein said weighting information comprises an information obtained from said matched filter.

10. An apparatus according to claim 8, wherein said estimating means is arranged to estimate said channel impulse response by using correlations between received and known training sequences.

11. An apparatus according to claim 10, wherein said channel equalizing means is arranged to estimate by using said correlations as a decision metric addition to matched filtered samples.

12. An apparatus according to claim 8, wherein said reference channel equalizing means is arranged to estimate by using said adaptive reference time domain characteristics as a channel delay spread and signal distortion metric.

13. An apparatus according to claim 8, wherein said comparing means comprises counting means for counting the differences between the output signals of said channel equalizing means and said reference channel equalizing means over a predetermined measuring period.

* * * * *